United States Patent
Anhut et al.

(10) Patent No.: US 10,726,529 B2
(45) Date of Patent: Jul. 28, 2020

(54) METHOD FOR THE DETERMINATION AND COMPENSATION OF GEOMETRIC IMAGING ERRORS

(71) Applicant: Carl Zeiss Microscopy GmbH, Jena (DE)

(72) Inventors: Tiemo Anhut, Jena (DE); Tobias Kaufhold, Jena (DE); Daniel Schwedt, Jena (DE); Burkhard Roscher, Jena (DE); Frank Klemm, Jena (DE); Daniel Haase, Zoellnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 15/737,152

(22) PCT Filed: Jun. 3, 2016

(86) PCT No.: PCT/EP2016/062644
§ 371 (c)(1),
(2) Date: Dec. 15, 2017

(87) PCT Pub. No.: WO2016/202612
PCT Pub. Date: Dec. 22, 2016

(65) Prior Publication Data
US 2018/0174279 A1    Jun. 21, 2018

(30) Foreign Application Priority Data

Jun. 17, 2015    (DE) .................. 10 2015 109 674

(51) Int. Cl.
*G06T 5/00*    (2006.01)
*G02B 21/00*    (2006.01)
(Continued)

(52) U.S. Cl.
CPC ............ *G06T 5/006* (2013.01); *G02B 21/008* (2013.01); *G02B 27/0031* (2013.01); *G06T 5/50* (2013.01);
(Continued)

(58) Field of Classification Search
CPC .. G06T 5/006; G06T 7/97; G06T 5/50; G06T 7/0002; G06T 2207/30168; G06T 2207/10056; G02B 21/008; G02B 27/0031
See application file for complete search history.

(56) References Cited

U.S. PATENT DOCUMENTS

| 6,037,583 A | 3/2000 | Moehler et al. |
| 9,063,342 B2 * | 6/2015 | Knoblich ............. G02B 21/365 |

(Continued)

FOREIGN PATENT DOCUMENTS

| DE | 197 02 752 C2 | 12/2001 |
| DE | 10 2008 059 372 A1 | 9/2009 |

(Continued)

OTHER PUBLICATIONS

International Preliminary Report on Patentability of International Application No. PCT/EP2016/062644 dated Dec. 19, 2017 & Written Opinion of the International Searching Authority.

(Continued)

*Primary Examiner* — John W Lee
(74) *Attorney, Agent, or Firm* — Duane Morris LLP

(57) ABSTRACT

A method for the determination and compensation of geometric imaging errors which occur during the imaging of an object by sequential single or multispot scanning by means of a microscopic imaging system, which includes: establishing a reference object with a defined plane structure; and generating an electronic image data set of this structure free of geometric imaging errors. Then, generating at least one (Continued)

electronic actual image data set with the imaging system; comparing the actual image data set with the reference image data set with respect to the locations of those pixels which have the same object point as origin in each case; and determining location deviations in the actual image data set compared to the reference image data set.

13 Claims, 1 Drawing Sheet

(51) Int. Cl.
    *G02B 27/00*     (2006.01)
    *G06T 7/00*     (2017.01)
    *G06T 5/50*     (2006.01)

(52) U.S. Cl.
    CPC .............. *G06T 7/0002* (2013.01); *G06T 7/97* (2017.01); *G06T 2207/10056* (2013.01); *G06T 2207/30168* (2013.01)

(56) References Cited

U.S. PATENT DOCUMENTS

| | | | | |
|---|---|---|---|---|
| 10,132,685 | B2* | 11/2018 | Shafer | ............... G01J 3/021 |
| 2002/0162955 | A1* | 11/2002 | Engelhardt | ......... G02B 21/002 |
| | | | | 250/234 |
| 2003/0055588 | A1 | 3/2003 | Nikitin | |
| 2005/0117188 | A1* | 6/2005 | Ishihara | ............... G02B 26/101 |
| | | | | 359/202.1 |
| 2006/0011861 | A1 | 1/2006 | Wolleschensky et al. | |
| 2009/0008539 | A1 | 1/2009 | Steinert | |
| 2009/0154822 | A1* | 6/2009 | Cabral | ................... G06T 5/006 |
| | | | | 382/255 |
| 2011/0025837 | A1* | 2/2011 | Vossen | ................ G02B 21/002 |
| | | | | 348/79 |
| 2011/0134254 | A1 | 6/2011 | Hulsken et al. | |
| 2015/0185523 | A1 | 7/2015 | Matsumoto et al. | |

FOREIGN PATENT DOCUMENTS

| | | |
|---|---|---|
| DE | 11 2013 003 671 T5 | 4/2015 |
| JP | 2005 115072 A | 4/2005 |
| JP | 2005 308974 A | 11/2005 |
| JP | 2006 031008 A | 2/2006 |
| JP | 2015 513671 A | 5/2015 |
| WO | 2013 126762 A1 | 8/2013 |

OTHER PUBLICATIONS

Japanese Office Action for JP 2017-564855 dated Feb. 25, 2020.
English translation of Japanese Office Action for JP 2017-564855 dated Feb. 25, 2020.

\* cited by examiner

METHOD FOR THE DETERMINATION AND COMPENSATION OF GEOMETRIC IMAGING ERRORS

RELATED APPLICATIONS

The present application is a U.S. National Stage application of International PCT Application No. PCT/EP2016/062644 filed on Jun. 3, 2016 which claims priority benefit of German Application No. DE 10 2015 109 674.9 filed on Jun. 17, 2015, the contents of each are incorporated by reference in their entirety.

FIELD OF THE INVENTION

The invention relates to a method for the determination and compensation of geometric imaging errors which occur during the imaging of an object by sequential single or multispot scanning by means of a microscopic imaging system, for example a laser scanning microscope.

The scanning takes place with laser radiation focussed at points of light, the spots, wherein as many locations of the object as possible are successively illuminated by each spot and the light reflected by the illuminated object points or generated by fluorescence is detected individually. The detection signals comprise information about point of origin and brightness and thus correspond to individual images of the object points. All of the detection signals obtained from the focal plane of a microscope objective produce an image of this plane of the object.

The ideal case is always to be sought, namely that the location of each individual image in the overall image precisely corresponds to the location of the associated point on or in the actual object. This then makes it possible to also correlate the partial images of the specimen areas scanned through different points for each multispot scan, with the result that a superimposition and offsetting of identical image contents becomes possible.

However, because of various technical and technological influences on image acquisition, this is not the case as a rule. The cause lies in accuracy tolerances of the mechanical, optical or also electronic assemblies of the imaging system used in each case.

Thus, for example, the scanning movement generated by a scanning apparatus is subject to non-linearities with respect to direction, speed and/or amplitude, which lead to the ideal condition not being met and the object being imaged geometrically deformed.

STATE OF THE ART

In order to at least reduce such influences, DE 19702752 C2 proposes modifying the control curves for the scanners in such a way that as linear as possible a scanning movement is achieved. For this, when using a laser scanning microscope which is equipped with an oscillating motor for driving an oscillating mirror for the purpose of the linearly oscillating deflection of a beam bundle, with a control unit for supplying the oscillating motor with variable exciting current, with a function generator and with a measurement value transducer for obtaining a sequence of information about the deflection positions of the oscillating mirror. The measurement value transducer is connected with the function generator for determining correction values for the exciting current, with which the control frequencies emitted by the function generator are influenced, such that the deviations are at least minimized.

Despite this measure, remaining residual errors still lead to image deformations, particularly in the form of compressions and elongations of the image in the direction of the scanning movement.

In the case of imaging systems with bi-directional scanning movement, although the scanning speed is advantageously doubled, it is disadvantageous that the non-linearities of the scanning movement in both scanning directions occur at different locations, resulting in lateral offset of the pixels compared to the associated object points, known as bidi errors.

Reciprocal influence of the two X and Y scanning axes in the case of two-dimensional scanning can also lead to so-called "wobble" and thus also to geometric imaging errors.

In particular, in the case of multispot imaging the deformations caused by non-linearities of the scan process occur in each partial image at different positions relative to the items of image information, as they act simultaneously on each excitation spot; however, the laser spots are arranged offset relative to each other in the specimen. Thus identical image contents from the different partial images cannot be superimposed congruently.

If parameters of the optical design of stationary assemblies of the imaging system, for instance of objectives, deviate from predefined parameters, this also causes geometric imaging errors, for example in the form of barrel or pincushion distortions.

DESCRIPTION OF THE INVENTION

On the basis of this state of the art, the object of the invention is to create a method of the type named at the outset, which no longer has the known disadvantages.

The object is achieved for a method of the type named at the outset with the following method steps:

establishing a reference object which has a defined, plane structure that can be represented in images, independently of the imaging system, generating an electronic image data set of this structure free of geometric imaging errors in which the location of the causative object point is assigned to each location of a pixel on a one-to-one basis, saving and maintaining the image data set as reference image data set, generating at least one electronic actual image data set with the imaging system, in which the causative object point is again assigned to each pixel, comparing the actual image data set with the reference image data set with respect to the locations of those pixels which are assigned to the same object points, determining location deviations of the pixels in the actual image data set compared to the corresponding pixels in the reference image data set, saving determined location deviations as correction data, compensating for the geometric imaging errors by correction of the location deviations in the actual image data set with reference to the correction data.

Within the meaning of this invention, in the case of single- or multispot scanning, both geometric imaging errors caused due to non-linearities, referred to hereafter as deformations, and geometric imaging errors caused due to deviating parameters of the optical design, hereafter called distortions, are considered as geometric imaging errors.

By "non-linearity" is meant deviations from nominal values, for example, of the speed, direction and/or amplitude predefined by a scanning apparatus for the purpose of scanning the object points. In contrast, distortions are local changes in the imaging scale caused by optical assemblies of the imaging system, in particular the change in magnification with increasing distance of the pixels from the optical axis. The distortion is characterized by rotation-symmetric distribution around a point, the distortion centre, such as e.g. a pincushion- or barrel-shaped change in a square imaging or wavy imaging of straight lines during the superimposition of higher-order distortions (Wikipedia "Distortion").

The method step "saving and maintaining this image data set as reference image data set" serves hereafter for calibrating the imaging system that is used for generating the actual image data set.

Carrying out the method according to the invention results in the presence of an electronic actual image data set corrected with respect to the geometric imaging errors from which, in a manner known per se, visually perceptible and—due to the preceding correction—geometrically error-free images are generated.

In different embodiments of the method according to the invention:
the compensation data relating to the deformation correction and the compensation data relating to the distortion correction are determined separately, i.e. separated from each other in time, and
used as a basis for the correction either directly in the course of the single- or multispot scanning or temporally thereafter.

In the embodiment of the method according to the invention provided for correcting deformations, the capture of the compensation data is carried out either with reference to only one actual image data set or—preferably for the purpose of increasing accuracy—with reference to several actual image data sets, wherein the actual image data sets are recorded in the case of scanning speeds, scanning directions and/or scanning amplitudes that are different in each case. In the latter case, the compensation data are determined from the comparison of the statistically averaged or interpolated locations of the pixels in the actual image data sets with the corresponding locations of the pixels in the reference image data set.

In a particularly advantageous embodiment, it is provided to capture the actual deflection angles actually generated with the scanning apparatus, to compare them with the nominal deflection angles, to determine correction values for the scanner control from the comparison and thus to optimize the scanner control. The correction of the imaging errors with the method according to the invention can be carried out even more efficiently with this option.

The method steps for correcting deformations are preferably carried out during the single- or multispot scanning of the object, wherein in the multispot method the compensation for each spot takes place individually.

In the embodiment of the method according to the invention provided for correcting distortions, it is provided either:
to record an actual image data set with a specific wavelength of the illumination light and to generate the compensation data from location deviations of the pixels in the actual image data set compared to the corresponding pixels in the reference image data set, or—preferably for the purpose of increasing accuracy; or
to record several actual image data sets with different wavelengths of the illumination light and to generate the compensation data from the comparison of the statistically averaged or interpolated locations of the pixels in the actual image data sets with the corresponding locations of the pixels in the reference image data set.

The method steps for correcting distortions are preferably carried out temporally after the single- or multispot scanning of the object, wherein, here too, in the multispot method the compensation for each spot takes place individually.

A flat grating or an electronically generated grating structure, for example, is used as reference object. In both embodiments, the actual image data sets to be used as a basis for the comparison with the reference image data set are advantageously recorded with the maximum possible image field size and lowest possible scanning speed in each case.

An important advantage of the method according to the invention is that, after its application in relation to a specific microscopic imaging system, the correction data can be permanently assigned to this imaging system and thus corrected images of any desired further objects can be generated.

The method according to the invention can also be used for the determination and compensation of geometric imaging errors which occur in the case of imagings of an object by sequential single- or multispot scanning by means of a microscopic imaging system that can be modified by exchanging optical assemblies, for example a laser scanning microscope with interchangeable objectives.

Correction data are assigned
either to each interchangeable assembly separately, or
to the entire imaging system unmodified by assembly exchange in each case and used as a basis for the compensation of the geometric imaging errors.

BRIEF DESCRIPTION OF THE DRAWINGS

The invention is explained in more detail below with reference to embodiment examples. In the annexed drawings.

DETAILED DESCRIPTION OF THE DRAWINGS

Figure 1:
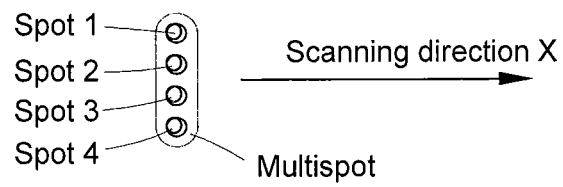
FIG. 1 shows the scanning of an object with a multispot which comprises n=4 single spots, which lie next to each other perpendicular to the scanning direction X.

In a first embodiment example, the method according to the invention is explained with reference to single-spot scanning of an object for the purpose of object imaging according to the principle of confocal laser scanning, wherein, with the laser beam focussed at a single spot continuously directed in a raster-like manner onto the object surface, in addition to the object geometry, the intensity of the reflected light relative to the individual, in each case adjacent, object points is also captured at the same time.

By means of an orifice plate, only light from the focal plane is detected and thus an image data set of the object is obtained from this plane with high depth resolution. If the focussing is changed after scanning a plane in each case, image data sets are obtained from further planes and finally a 3D recording of the object therefrom.

The scanning of the object usually takes place by deflection of the laser radiation by means of scanning mirrors, for example galvanometer or microsystem mirrors, also with other deflection means, such as acousto-optic deflectors. In addition to movable assemblies for one- or two-dimensional deflection, the laser light also passes from the radiation source to the detection device, through stationary optical assemblies, such as scanning objective, other lens groups, beam deflection elements and/or beam splitters.

In order first to determine and subsequently to compensate for geometric imaging errors in the form of deformations and/or distortions occurring for the above-named reasons during use of such an imaging system for object imaging, the method steps indicated below by way of example are performed:

a) an electronic image data set free of geometric imaging errors is generated by an optical grating, in which the location of a pixel is assigned to each location of a grating point on a one-to-one basis. This image data set is generated independently of the imaging system to be calibrated in the following method steps, for example directly electronically without optical means, b) this image data set is maintained as reference image data set for the further method steps, c) using the imaging system to be corrected, for example a laser scanning microscope, an actual image data set is obtained either from a single recording of the same grating with only one specific scanning speed, scanning direction and/or scanning amplitude, or preferably—for the purpose of increasing the accuracy of the correction of determined deformations to be carried out later—from several recordings of the grating with different scanning speeds, scanning directions and/or scanning amplitudes in each case, the results of which are statistically averaged, d) the thus-generated actual image data set is compared with the reference image data set with respect to the locations of the pixels which have the same location of the grating as origin, e) the location deviations are registered and saved as correction data, and f) on the basis of the correction data, in the actual image data set the determined location deviations and thus the deformations are compensated for.

Alternatively to the method steps c) to f), or immediately before or after the method steps c) to f), the following method steps indicated by way of example are carried out according to the invention, in order to compensate for distortions:

g) using the imaging system to be corrected, for example again the laser scanning microscope, an actual image data set is obtained either from a single recording of the same grating with a specific wavelength of the illumination light, or preferably—for the purpose of compensating for colour magnification errors—from several recordings of the grating with different wavelengths of the illumination light, the results of which are statistically averaged, h) the thus-generated actual image data set is compared with the reference image data set with respect to the locations of the pixels which have the same location of the grating as origin, i) location deviations are registered and saved as correction data, and j) on the basis of the correction data, in the actual image data set the determined location deviations and thus the distortions are compensated for.

The correction data determined with the method steps a) to f) or g) to j) are permanently assigned to this imaging system, with the result that, taking them into consideration, corrected images of any desired further objects can be generated with the same imaging system. The compensation of the deformations is preferably carried out during single-spot scanning, and the compensation of the distortions after single-spot scanning of the respective object.

In a second embodiment example described below, the method according to the invention is explained with reference to multispot scanning of an object. Whereas, in single-spot scanning the laser beam is focussed at one spot, the single spot, and the scanning of the object takes place therewith, in the multispot method, a multispot consisting of several single spots is generated and the object scanned therewith.

The light reflected by the scanned object points is detected and registered in assignment to the single spots. This takes place either by spatially separated detection, or temporal assignment.

Procedures are known, in which the object is scanned with a multispot which lies perpendicular to the scanning direction. With such multispot scanning, an n-times more rapid scanning of the object is advantageously achieved. In this regard FIG. 1 shows for example a multispot which comprises n=4 spots which lie next to each other perpendicular to the scanning direction X.

By way of example, in order for a laser scanning microscope to determine and to compensate for geometric imaging errors in the form of deformations and/or distortions, according to the invention the above-named method steps a) to f) or g) to j) are performed, always relative to the locations of the pixels generated by each single spot of the multispot, which pixels are assigned to the same object point, independently of the number n of the single spots.

Figure 2:
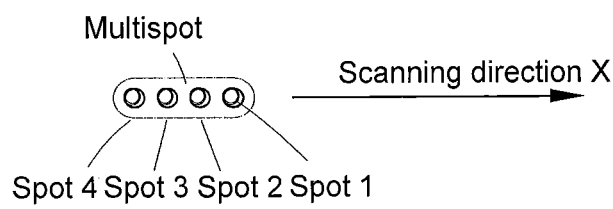
FIG. 2 shows the scanning of an object with a multispot which comprises n=4 single spots which lie next to each other in the scanning direction X and are directed onto the object with the same brightness.

In a third embodiment example described below, the method according to the invention is explained with reference to multispot scanning of an object, wherein the single spots, unlike in the above-named embodiment example, lie next to each other, not perpendicular to the scanning direction X but in the scanning direction X and are thus passed over the object directly behind one another. In this regard FIG. 2 shows for example a multispot which comprises n=4 single spots lying behind one another in the scanning direction X.

By way of example also in this case, in order for a laser scanning microscope to determine and to compensate for deformations and/or distortions, according to the invention the above-named method steps a) to f) or g) to j) are performed, again always relative to the locations of the pixels generated by each single spot of the multispot, which pixels are assigned to the same object point, independently of the number n of the spots of the multispot.

In the simplest case, all the single spots here are set equally bright, whereby an n-fold averaging of the image data can be achieved with one scan.

In a further associated embodiment, however, the n spots are set with different brightness. It is thus possible, with only one scan, to obtain digital high-contrast images according to the HDRI (High Dynamic Range Image) method, which allows the recording of necessary partial images in rapid succession, in particular in the case of rapidly mobile objects.

Figure 3:
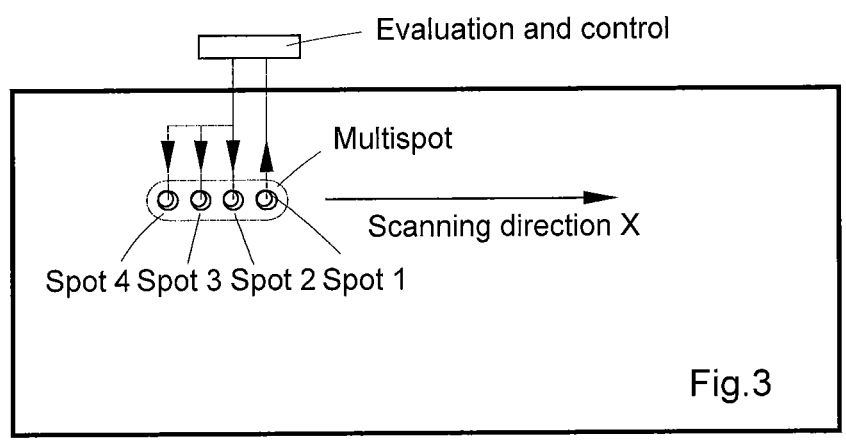
FIG. 3 shows the scanning of an object with a multispot which comprises n=4 single spots which lie next to each other in the scanning direction X and are directed onto the object with different brightness.

An even further improved quality of the image is achieved if the spots of the multispot passed sequentially over the object are individually varied in their intensity, by feeding back the detected signal intensity of a leading single spot onto the illumination intensity of the following spots in the multispot, as symbolically represented in FIG. 3. The spatial separation of the spots, which in the case of sequential scanning of the object translates into a temporal separation, then greatly reduces the demands on the control loop and, in the case of conventional scanning speeds, makes meaningful control possible in the first place. This also advantageously avoids a problem which arises during the conversion of a dynamic illumination, due to the fact that the illumination has to be controlled within the pixel time. This can frequently not be achieved in the pixel times in the microsecond range occurring in confocal microscopy. Too slow a control cannot then adapt the light intensity, whereas too rapid a control tends towards overshooting and thus to generate artefacts in the imaging.

Thus, by way of example, the intensity of the spot 1 can be set very low in order to illuminate the object as little as possible and thus to preserve it. Should the intensity of the signal already reach a sufficiently high, predefined value, the following spots 2 to 4 remain unaffected. In other cases, the intensity of the illumination is readjusted such that the signal concerned is correspondingly stronger. This method for controlled illumination leads in particular to an enhancement of dynamics in an image offset from the individual images. Furthermore, the specimen is thereby preserved in so far as only as much light as necessary for the signal generation at the local specimen location is introduced into the specimen.

In the case of such multispot scanning with controlled brightness of the single spots 1 to 4, the described geometric imaging errors can in fact also occur. Here too, in order to determine and to compensate for deformations and/or distortions, according to the invention the above-named method steps a) to f) or g) to j) are performed, again relative to the locations of the pixels generated by each single spot of the multispot, which pixels are assigned to the same object point, independently of the number n of the spots in the multispot.

A further advantage of this procedure according to the invention is the possibility of a very variable setting, of the scanning direction in the sense that the spots do not have to be passed over the specimen strictly one behind the other. Rather, the image field can be rotated in the usual manner for scanning microscopy, by setting the amplitude and phase of the scanner oscillation e.g. of both galvo scanners corresponding to the desired image field. Thus a primary scanning direction is predefined. A superimposition of the image contents is then achieved after distortion correction, due to the permanent relationship of the images to each other. For application of the above-described methods to image recording with high dynamics or controlled dynamic illumination, this means that the scanners can scan the specimen in any desired direction, so long as it is ensured that each location of the specimen is scanned by each single spot. The respective temporal difference between the scanning of the specimen by different multispots is then different and dependent on the primary scanning direction.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. Method for the determining and compensating geometric imaging errors which occur during the imaging of an object by sequential multispot scanning by means of a microscopic imaging system, comprising
    (a) establishing a reference object with a defined plane structure,
    (b) generating an electronic image data set of said plane structure free of geometric imaging errors, in which causative location of said reference object is assigned to each location of a pixel on a one-to-one basis,
    (c) saving and maintaining the image data set as a reference image data set,
    (d) multispot scanning the reference object with the imaging system and generating at least one electronic actual image data set with the imaging system for each spot, in which causative location of said reference object is again assigned to each location of a pixel,
    (e) comparing said actual image data set with the reference image data set with respect to the locations of those pixels which are assigned to the same locations of the object,
    (f) determining location deviations of the pixels in the actual image data set compared to the corresponding pixels in the reference image data set,
    (g) saving determined location deviations as correction data,
    (h) compensating individually for each spot for the geometric imaging errors by correction of the location deviations in the actual image data set with reference to the correction data, and then
    (i) superimposing the individually compensated image data to an image.

2. Method according to claim 1, wherein geometric imaging errors caused due to non-linearity in the case of single or multispot scanning, and geometric imaging errors caused due to deviating parameters of the optical design, are captured separately from each other and used as a basis for the compensation of the imaging errors during or temporally after the multispot scanning.

3. Method according to claim 2, in which the geometric imaging errors caused as a result of non-linearity of the speed, the direction and/or the amplitude of a scanning apparatus are captured and used as a basis for the compensation.

4. Method according to claim 3, in which
    the capture is carried out with reference to several actual image data sets in the case of scanning speeds, scanning directions or scanning amplitudes that are different in each case, and
    the compensation data are generated from statistically averaged or interpolated location deviations of the pixels in the actual image data sets compared to the corresponding pixels in the reference image data set.

5. Method according to claim 3, further comprising capturing actual deflection angles actually generated with the scanning apparatus, compared with the nominal deflection angles, and correction values are determined therefrom and these are used in order to minimize the deviations with a corrected control of the scanning apparatus.

6. Method according to claim 3, wherein compensating the location deviations is carried out for each spot individually.

7. Method according to claim 2, in which geometric imaging errors caused due to deviating parameters of the optical design are captured, wherein an actual image data set with a specific wavelength of the illumination light is recorded and the compensation data are generated from location deviations of the pixels in the actual image data set compared to the corresponding pixels in the reference image data set, or several actual image data sets with different wavelengths of the illumination light are recorded and the compensation data are generated from statistically averaged or interpolated location deviations of the pixels in the actual image data sets compared to the corresponding pixels in the reference image data set.

8. Method according to claim 7, in which the compensation of the location deviations is carried out temporally after the multispot scanning of the object, wherein in the multispot method the compensation for each spot takes place individually.

9. Method according to claim 1, wherein said actual image data sets are generated in each case with a maximum possible image field size and lowest possible scanning speed.

10. Method according to claim 1, wherein an object with a flat grating structure is used as said reference object.

11. Method according to claim 1, wherein correction data are permanently assigned to the imaging system, and thus corrected images of any desired further objects are generated.

12. Method according to claim 1, wherein
each location of the object to be imaged is illuminated with several spots sequentially in time, and
the detected signal intensity of a leading spot is fed back onto the illumination intensity of one or more of the following spots directed onto the same location of the object, with the result that because of the controlled illumination intensity,
both enhanced dynamics in the case of imaging of the individual locations of the object,
and an optimization, in particular reduction of the radiation exposure of the object are achieved.

13. Method according to claim 1, in which determination and compensation of geometric imaging errors which occur in the case of imagings of an object by sequential multispot scanning by means of a microscopic imaging system that can be modified by exchanging optical assemblies, by means of a laser scanning microscope, wherein separate correction data are assigned to each interchangeable assembly, or correction data are assigned to the imaging system as a whole unmodified by assembly exchange in each case and used as a basis for the compensation of the geometric imaging errors.

* * * * *